United States Patent
Kwon et al.

(10) Patent No.: US 11,289,950 B2
(45) Date of Patent: Mar. 29, 2022

(54) WIRELESS CHARGING APPARATUS

(71) Applicant: LG ELECTRONICS INC., Seoul (KR)

(72) Inventors: Jaesoon Kwon, Seoul (KR); Hwanyong Kim, Seoul (KR); Beomseok Chae, Seoul (KR); Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 16/713,166

(22) Filed: Dec. 13, 2019

(65) Prior Publication Data

US 2020/0220389 A1 Jul. 9, 2020

(30) Foreign Application Priority Data

Dec. 14, 2018 (KR) .................. 10-2018-0161923

(51) Int. Cl.
*H02J 7/00* (2006.01)
*H02J 50/40* (2016.01)
*H02J 50/10* (2016.01)
*H02J 50/70* (2016.01)

(52) U.S. Cl.
CPC ...... *H02J 50/402* (2020.01); *H02J 7/007192* (2020.01); *H02J 50/10* (2016.02); *H02J 50/70* (2016.02)

(58) Field of Classification Search
USPC ........................................ 320/108
See application file for complete search history.

(56) References Cited

U.S. PATENT DOCUMENTS

| | | |
|---|---|---|
| 2011/0050382 A1 | 3/2011 | Baarman et al. |
| 2018/0090956 A1 | 3/2018 | Graham et al. |
| 2018/0343038 A1* | 11/2018 | Singh ................ H01F 27/38 |
| 2019/0081517 A1* | 3/2019 | Graham .............. G01K 7/22 |
| 2019/0393733 A1* | 12/2019 | Radchenko ......... H02J 50/12 |

FOREIGN PATENT DOCUMENTS

WO WO 2018/080049 A1 5/2018

* cited by examiner

*Primary Examiner* — Bryce M Aisaka
(74) *Attorney, Agent, or Firm* — Birch, Stewart, Kolasch & Birch, LLP

(57) ABSTRACT

A wireless charging apparatus is disclosed. The wireless charging apparatus includes a plurality of coil arrays disposed so as to partially overlap each other, and a shielding member disposed at one side of each of the coil arrays to block a leaked magnetic field. The coil arrays include a first coil array including a plurality of transmission coils disposed adjacent to each other, a second coil array including a smaller number of transmission coils than the first coil array and disposed under the first coil array, and a third coil array including the same number of transmission coils as the second coil array and disposed on the first coil array. As a result, it is possible to simultaneously charge a plurality of devices requiring different amounts of power.

19 Claims, 12 Drawing Sheets

(a)

(b)

WIRELESS CHARGING APPARATUS

CROSS-REFERENCE TO RELATED APPLICATION

This application claims the priority benefit of Korean Patent Application No. 10-2018-0161923, filed on Dec. 14, 2018 in the Korean Intellectual Property Office, the disclosure of which is incorporated herein by reference.

BACKGROUND OF THE INVENTION

1. Field of the Invention

The present disclosure relates to a wireless power transmission apparatus, and more particularly to a wireless charging apparatus capable of simultaneously charging a plurality of devices requiring different amounts of power.

2. Description of the Related Art

As a method of supplying power to an electronic device, there is a terminal supply method of interconnecting a commercial power source and an electronic device using physical cables or wires. However, the terminal supply method has problems in that the cables or wires occupy a large space, are difficult to arrange, and entail the risk of disconnection.

In order to solve these problems, studies have recently been conducted to develop a wireless power transmission method. Further, a wireless charging apparatus for a mobile terminal provided in a vehicle has been developed.

However, a conventional wireless charging apparatus for a mobile terminal provided in a vehicle is not suitable for charging a plurality of devices due to the small number of transmission coils and the large sizes of the transmission coils.

In particular, the conventional wireless charging apparatus for a mobile terminal provided in a vehicle is incapable of charging a plurality of devices requiring different amounts of power.

SUMMARY OF THE INVENTION

Therefore, the present disclosure has been made in view of the above problems, and it is an object of the present disclosure to provide a wireless charging apparatus capable of simultaneously charging a plurality of devices requiring different amounts of power while simultaneously driving a plurality of arrays.

It is another object of the present disclosure to provide a wireless charging apparatus capable of simultaneously charging a plurality of devices requiring different amounts of power while reducing manufacturing costs.

It is a further object of the present disclosure to provide a wireless charging apparatus capable of optimizing charging efficiency while stacking a plurality of coil arrays on one another.

However, the objects to be accomplished by the present disclosure are not limited to the above-mentioned objects, and other objects not mentioned herein will be clearly understood by those skilled in the art from the following description.

In accordance with the present disclosure, the above and other objects can be accomplished by the provision of a wireless charging apparatus including a plurality of coil arrays disposed so as to partially overlap each other, and a shielding member disposed at one side of each of the coil arrays to block a leaked magnetic field. The coil arrays include a first coil array including a plurality of transmission coils disposed adjacent to each other, a second coil array including a smaller number of transmission coils than the first coil array and disposed under the first coil array, and a third coil array including the same number of transmission coils as the second coil array and disposed on the first coil array.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings.

As used herein, the suffixes "module" and "unit" are added or interchangeably used to facilitate preparation of this specification and are not intended to suggest unique meanings or functions.

Terms including ordinal numbers such as first, second, etc. can be used to explain various elements. However, it will be appreciated that the elements are not limited to such terms. These terms are merely used to distinguish one element from another.

It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

A wireless charging apparatus 100 according to an embodiment of the present disclosure can transmit power to a device placed on a charging surface using a magnetic induction phenomenon in which current is induced to a reception coil by changing a magnetic field of a transmission coil.

In this case, the wireless charging apparatus 100 and the device can perform wireless charging using an electromagnetic induction scheme defined by the Wireless Power Consortium (WPC).

Since the wireless charging apparatus 100 wirelessly transmits power, it can be referred to as a wireless power transmission apparatus. Correspondingly, since the device placed on the charging surface wirelessly receives power, it can be referred to as a wireless power transmission apparatus.

The wireless charging apparatus 100 can wirelessly transmit power to the device to charge the same.

For example, the device can be a laptop computer, a personal digital assistant (PDA), a portable multimedia player (PMP), a navigation device, an MP3 player, an electric toothbrush, a lighting device, and a remote control. Preferably, the device can be a mobile phone requiring a first amount of power and/or a smart watch requiring a second amount of power, which is smaller than the first amount of power.

Hereinafter, the internal configuration of the wireless charging apparatus 100 will be described in detail.

Figure 1:
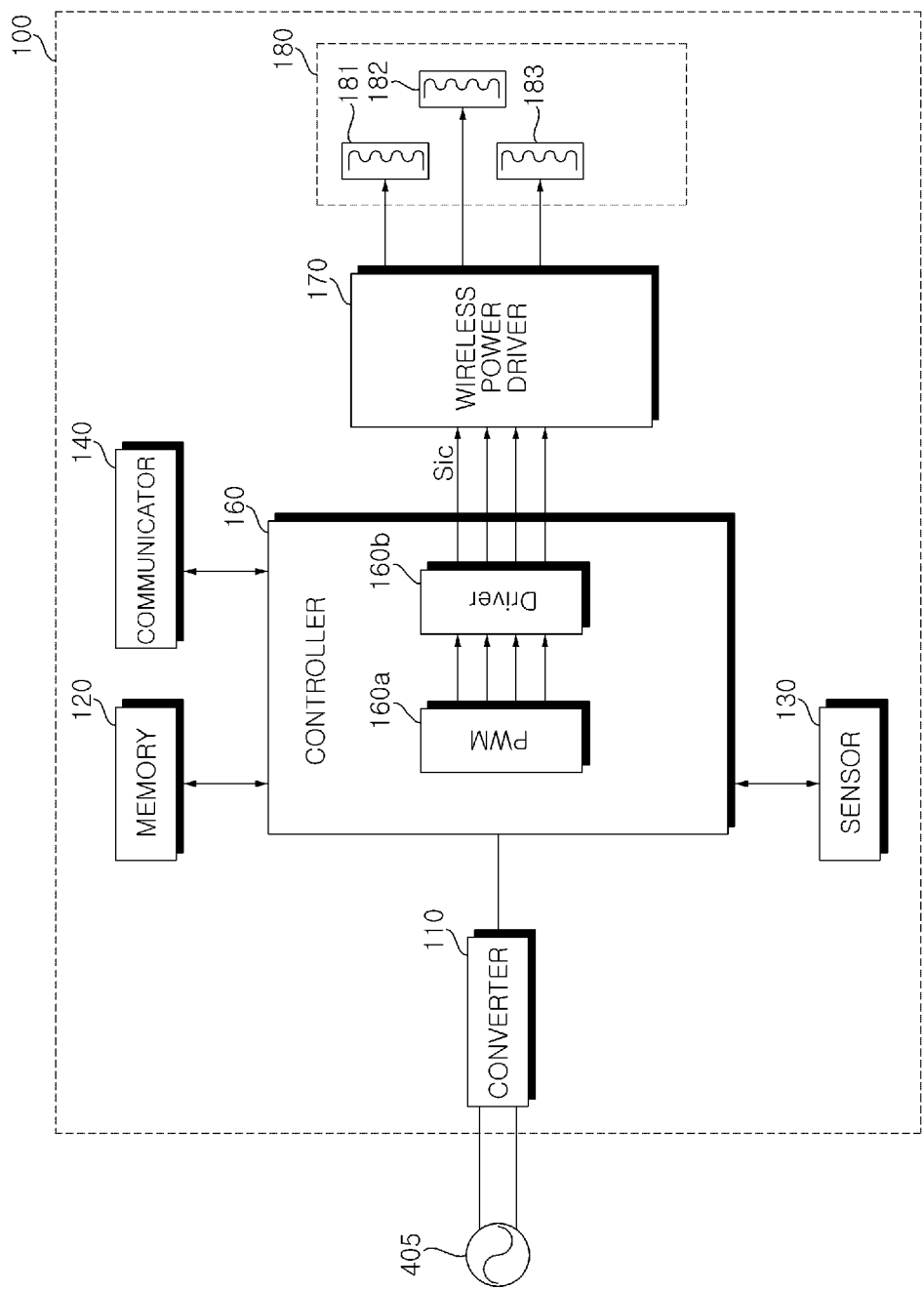
FIG. 1 is a block diagram of the internal configuration of a wireless charging apparatus according to an embodiment of the present disclosure.

FIG. 1 is a block diagram of the internal configuration of the wireless charging apparatus according to an embodiment of the present disclosure.

Referring to the drawing, the wireless charging apparatus 100 can include a converter 110 for converting alternating-current (AC) power from an AC power source 405 into direct-current (DC) power, a wireless power driver 170 for converting the DC power into AC power, and a coil 180 for wirelessly transmitting power using the converted AC power.

In addition, in order to realize transmission of power and communication, the wireless charging apparatus 100 can further include a controller 160 for controlling the internal configuration of the wireless charging apparatus 100, a communicator 140 for communicating with the device placed on the charging surface using a predetermined communication scheme, a sensor 130 for sensing current flowing through the wireless charging apparatus 100, the temperature of the coil 180, and the like, and a memory 120 for storing a control program for driving the wireless charging apparatus 100.

The wireless charging apparatus 100 can be operated by DC power, which can be supplied from the converter 110, which converts AC power into DC power.

In some embodiments, the wireless charging apparatus 100 can be configured such that the wireless power driver 170 directly receives DC power without the converter 110.

The converter 110 can convert AC power from the AC power source 405 into DC power and can output the DC power. Although the AC power source 405 is illustrated as being a single-phase AC power source in the drawing, it can be a three-phase AC power source. The internal structure of the converter 110 can vary depending on the type of the AC power source 405.

The converter 110 can be constituted by diodes without a switching element, and thus can implement rectification without a separate switching operation.

For example, in the case in which the AC power source 405 is a single-phase AC power source, the converter 110 can include four diodes in the form of a bridge, and in the case in which the AC power source 405 is a three-phase AC power source, the converter 110 can include six diodes in the form of a bridge.

Alternatively, the converter 110 can be a half-bridge-type converter in which two switching elements and four diodes are interconnected. In the case in which the AC power source 405 is a three-phase AC power source, the converter 110 can include six switching elements and six diodes.

When DC power is supplied to the wireless power driver 170 during wireless power transmission, the controller 160 can control the wireless power driver 170 to wirelessly transmit power to the wireless power reception apparatus. In this case, the wireless power driver 170 can convert the DC power into AC power for wireless power transmission.

Specifically, the controller 160 can include a PWM generator 160a for generating a PWM signal and a driver 160b for generating and outputting a driving signal Sic based on the PWM signal.

The controller 160 can determine the duty of the PWM signal based on the amount of transmitted power, the current flowing through the wireless power driver 170, and the like. The PWM generator 160a can generate a PWM signal based on the duty of the PWM signal. The driver 160b can output a driving signal Sic for driving the wireless power driver 170 based on the PWM signal.

The wireless power driver 170 can include at least one switching element for converting DC power into AC power. For example, when the switching element is an IBGT, a gate driving signal can be output from the driver 160b, and can be input to a gate terminal of the switching element. In addition, the switching element can perform a switching operation in response to the gate driving signal. DC power can be converted into AC power by the switching operation of the switching element and can be output to the coil 180.

The coil 180 can include a plurality of coil arrays 181, 182 and 183, and the controller 160 can perform control such that wireless power is simultaneously transmitted through the coil arrays 181, 182 and 183, which will be described later.

That is, the controller 160 can simultaneously and wirelessly transmit power to a plurality of devices by driving the coil 180 in a single-driving mode, rather than in a multi-driving mode.

In some embodiments, the wireless power driver 170 can be included in the controller 160.

The coil 180 can include a plurality of coil arrays 181, 182 and 183 and a shielding member disposed at one side of each of the coil arrays to block a leaked magnetic field.

The structure of the coil 180 will be described in more detail later with reference to FIG. 2.

The communicator 140 can communicate with the wireless power reception apparatus using a predetermined communication scheme.

The communicator 140 can process information about the state of the wireless charging apparatus 100, power control information, and the like into certain signals, and can transmit the processed signals to the wireless power reception apparatus. In addition, the communicator 140 can receive information about the state of the wireless power reception apparatus, information about the amount of used power, charging efficiency information, and the like, can process these pieces of information into certain signals, and can transmit the processed signals to the controller 160.

The sensor 130 can measure the temperatures of the coil arrays 181, 182 and 183 or the temperature of the shielding member 190 in order to determine whether the wireless charging apparatus 100 is overheating, and can provide the measurement result to the controller 160.

In this case, the controller 160 can interrupt the wireless transmission of power to the wireless power reception apparatus based on information about the voltage, the current, the temperature, and the like measured by the sensor 130.

The memory 120 can store a program for operating the wireless charging apparatus 100.

Figure 2:
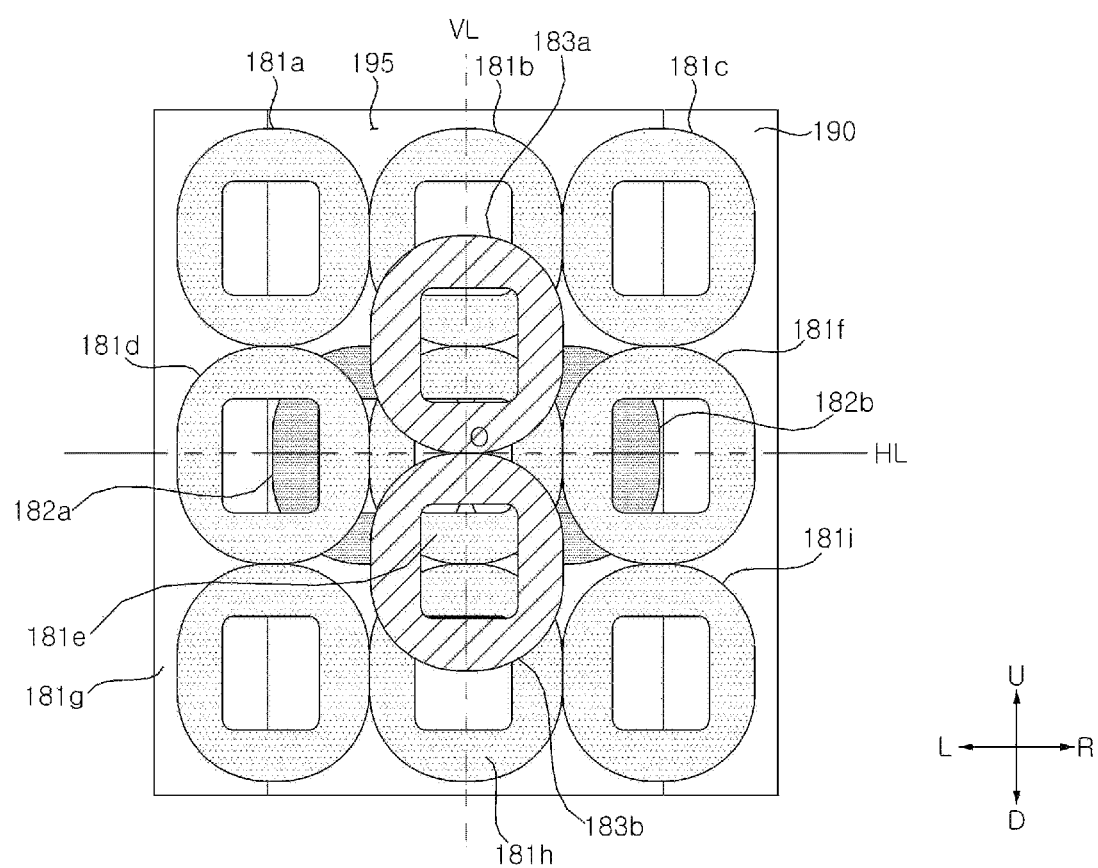
FIG. 2 is a front view of a coil shown in FIG. 1.
Figure 3:
FIG. 3 is a right side view of the coil shown in FIG. 2.
Figure 4:
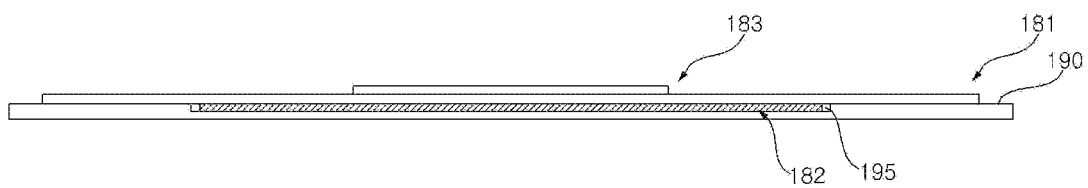
FIG. 4 is a left side view of the coil shown in FIG. 2.

FIG. 2 is a front view of the coil shown in FIG. 1, FIG. 3 is a right side view of the coil shown in FIG. 2, and FIG. 4 is a left side view of the coil shown in FIG. 2.

Referring to the drawings, the wireless charging apparatus 100 according to an embodiment of the present disclosure can include a plurality of coil arrays 181, 182 and 183 and a shielding member 190 disposed at one side of each of the coil arrays 181, 182 and 183 to block a leaked magnetic field.

The coil arrays 181, 182 and 183 can include a first coil array 181, a second coil array 182, and a third coil array 183. The first coil array 181, the second coil array 182, and the third coil array 183 can be stacked on one another.

Specifically, the coil arrays 181, 182 and 183 can include a first coil array 181 including a plurality of transmission coils disposed adjacent to each other, a second coil array 182 including a smaller number of transmission coils than the first coil array 181, the second coil array 182 being disposed under the first coil array 181, and a third coil array 183 including the same number of transmission coils as the second coil array 182, the third coil array 183 being disposed on the first coil array 181.

That is, the coil arrays 181, 182 and 183 can be stacked on one another in the order of the second coil array 182, the first coil array 181, and the third coil array 183.

The coil arrays 181, 182 and 183 can be disposed on the shielding member 190. That is, the shielding member 190 can be disposed under the second coil array 182. In this case, the second coil array 182 can be seated in a recess 195 formed in the shielding member 190, which will be described later.

The contact regions of the first coil array 181 and the second coil array 182 can be adhered to each other using an adhesive material. Similarly, the contact regions of the second coil array 182 and the third coil array 183 can also be adhered to each other using an adhesive material.

When the number of stacked layers is 4 or more, the field deconstruction effect caused by overlapping fields (e.g., h-fields) becomes greater than the field construction effect, and thus it is preferable that the coil arrays 181, 182 and 183 have a three-layered structure.

The first coil array 181 can include first to ninth main transmission coils 181*a* to 181*i* disposed adjacent to each other.

In detail, the first coil array 181 can be formed in a matrix type having three rows and three columns.

In particular, the internal regions of the main transmission coils need to be disposed as close to each other as possible in order to prevent the charging area from being split. Each of the main transmission coils can be in contact with other main transmission coils disposed in adjacent rows and columns.

The first main transmission coil 181*a* can be disposed in the first row and the first column, and can be in contact with the second main transmission coil 181*b* disposed in the first row and the second column and the fourth main transmission coil 181*d* disposed in the second row and the first column.

The second main transmission coil 181*b* can be disposed in the first row and the second column, and can be in contact with the first main transmission coil 181*a* disposed in the first row and the first column, the third main transmission coil 181*c* disposed in the first row and the third column, and the fifth main transmission coil 181*e* disposed in the second row and the second column.

The third main transmission coil 181*c* can be disposed in the first row and the third column, and can be in contact with the second main transmission coil 181*b* disposed in the first row and the second column and the sixth main transmission coil 181*f* disposed in the second row and the third column.

The fourth main transmission coil 181*d* can be disposed in the second row and the first column, and can be in contact with the first main transmission coil 181*a* disposed in the first row and the first column, the fifth main transmission coil 181*e* disposed in the second row and the second column, and the seventh main transmission coil 181*g* disposed in the third row and the first column.

The fifth main transmission coil 181*e* can be disposed in the second row and the second column, and can be in contact with the second main transmission coil 181*b* disposed in the first row and the second column, the fourth main transmission coil 181*d* disposed in the second row and the first column, the sixth main transmission coil 181*f* disposed in the second row and the third column, and the eighth main transmission coil 181*h* disposed in the third row and the second column.

The sixth main transmission coil 181*f* can be disposed in the second row and the third column, and can be in contact with the third main transmission coil 181*c* disposed in the first row and the third column, the fifth main transmission coil 181*e* disposed in the second row and the second column, and the ninth main transmission coil 181*i* disposed in the third row and the third column.

The seventh main transmission coil 181*g* can be disposed in the third row and the third column, and can be in contact with the fourth main transmission coil 181*d* disposed in the second row and the first column and the eighth main transmission coil 181*h* disposed in the third row and the second column.

The eighth main transmission coil 181*h* can be disposed in the third row and the second column, and can be in contact with the seventh main transmission coil 181*g* disposed in the third row and the first column, the ninth main transmission coil 181*i* disposed in the third row and the third column, and the fifth main transmission coil 181*e* disposed in the second row and the second column.

The ninth main transmission coil 181*i* can be disposed in the third row and the third column, and can be in contact with the eighth main transmission coil 181*h* disposed in the third row and the second column and the sixth main transmission coil 181*f* disposed in the second row and the third column.

The main transmission coils can be adhered to each other using an adhesive material.

The first to ninth main transmission coils 181*a* to 181*i* can convert current into magnetic flux and can wirelessly transmit power to the device. Since the first to ninth main transmission coils 181*a* to 181*i* occupy the largest area on the shielding member 190, the first to ninth main transmission coils 181*a* to 181*i* are involved in the transmission of first power required for a mobile terminal and the transmission of second power required for a smart watch. In this case, the first power can be greater than the second power.

The second coil array 182 can include a first auxiliary transmission coil 182*a* and a second auxiliary transmission coil 182*b* disposed so as to be in contact with each other. The first auxiliary transmission coil 182*a* and the second auxiliary transmission coil 182*b* can be adhered to each other using an adhesive material.

The shielding member 190 can have a recess 195 formed therein so as to extend in an upward-downward direction U-D. The first auxiliary transmission coil 182*a* and the second auxiliary transmission coil 182*b* can be seated in the recess 195.

The first auxiliary transmission coil 182*a* and the second auxiliary transmission coil 182*b* can be formed to be in contact with each other at the center O of the shielding member 190.

The first auxiliary transmission coil 182*a* and the second auxiliary transmission coil 182*b* can be disposed so as to be symmetric to each other in a leftward-rightward direction L-R with respect to the vertical center line VL of the shielding member 190.

Since the transmission coils included in the coil arrays 181, 182 and 183 have the same shape, the fifth main transmission coil 181*e* can be disposed on the contact region between the first auxiliary transmission coil 182*a* and the second auxiliary transmission coil 182*b*.

In addition, the first auxiliary transmission coil 182*a* and the second auxiliary transmission coil 182*b* can be disposed so as to partially overlap the fourth main transmission coil 181*d*, the fifth main transmission coil 181*e*, and the sixth main transmission coil 181*f*.

Accordingly, the coupling factor can be concentrated on the center region of the shielding member 190, and the intensity of the magnetic field in the center region of the shielding member 190 can increase.

Although the first auxiliary transmission coil 182*a* and the second auxiliary transmission coil 182*b* are illustrated as being disposed so as to be symmetric to each other in the leftward-rightward direction L-R with respect to the vertical center line VL of the shielding member 190 in FIG. 2, the first auxiliary transmission coil 182*a* and the second auxiliary transmission coil 182*b* can be understood as being symmetric to each other in the upward-downward direction U-D in accordance with the direction in which the coil 180 is actually installed. The direction in which the first auxiliary transmission coil 182*a* and the second auxiliary transmission coil 182*b* are symmetric to each other can be perpendicular to the direction in which a third auxiliary transmission coil 183*a* and a fourth auxiliary transmission coil 183*b*, which will be described later, are symmetric to each other.

The third coil array 183 can include a third auxiliary transmission coil 183*a* and a fourth auxiliary transmission coil 183*b* disposed so as to be in contact with each other. The third auxiliary transmission coil 183*a* and the fourth auxiliary transmission coil 183*b* can be adhered to each other using an adhesive material.

The third auxiliary transmission coil 183*a* and the fourth auxiliary transmission coil 183*b* can be formed to be in contact with each other at the center O of the shielding member 190. The direction in which the third auxiliary transmission coil 183*a* and the fourth auxiliary transmission coil 183*b* are symmetric to each other can be different from the direction in which the first auxiliary transmission coil 182*a* and the second auxiliary transmission coil 182*b* are symmetric to each other.

The third auxiliary transmission coil 183*a* and the fourth auxiliary transmission coil 183*b* can be disposed so as to be symmetric to each other in the upward-downward direction U-D with respect to the horizontal center line HL of the shielding member 190.

Since the transmission coils included in the coil arrays 181, 182 and 183 have the same shape, the fifth main transmission coil 181*e* can be disposed under the contact region between the third auxiliary transmission coil 183*a* and the fourth auxiliary transmission coil 183*b*.

In addition, the third auxiliary transmission coil 183*a* and the fourth auxiliary transmission coil 183*b* can be disposed so as to partially overlap the second main transmission coil 181*b*, the fifth main transmission coil 181*e*, and the eighth main transmission coil 181*h*.

In addition, the first and second auxiliary transmission coils 182*a* and 182*b*, the fifth main transmission coil 181*e*, and the third and fourth auxiliary transmission coils 183*a* and 183*b* can be disposed so as to overlap each other.

Accordingly, the coupling factor can be further concentrated on the center region of the shielding member 190, and the intensity of the magnetic field in the center region of the shielding member 190 can further increase.

Although the third auxiliary transmission coil 183*a* and the fourth auxiliary transmission coil 183*b* are illustrated as being disposed so as to be symmetric to each other in the upward-downward direction U-D with respect to the horizontal center line HL of the shielding member 190 in FIG. 2, the third auxiliary transmission coil 183*a* and the fourth auxiliary transmission coil 183*b* can be understood as being symmetric to each other in the leftward-rightward direction L-R in accordance with the direction in which the coil 180 is actually installed. The direction in which the third auxiliary transmission coil 183*a* and the fourth auxiliary transmission coil 183*b* are symmetric to each other can be determined in accordance with the direction in which a mobile terminal is placed on the charging surface.

For example, the third auxiliary transmission coil 183*a* and the fourth auxiliary transmission coil 183*b* can be disposed so as to be symmetric to each other in the upward-downward direction U-D with respect to the center line in the width direction of the mobile terminal that is to be placed on the charging surface. Alternatively, the third auxiliary transmission coil 183*a* and the fourth auxiliary transmission coil 183*b* can be disposed in consideration of the longitudinal direction of the mobile terminal that is to be placed on the charging surface.

In this case, the first auxiliary transmission coil 182*a* and the second auxiliary transmission coil 182*b* can be disposed so as to be symmetric to each other in the leftward-rightward direction L-R with respect to the center line in the longitudinal direction of the mobile terminal that is to be placed on the charging surface. The first auxiliary transmission coil 182*a* and the second auxiliary transmission coil 182*b* can be disposed in consideration of the width direction of the mobile terminal that is to be placed on the charging surface.

That is, the direction in which the first auxiliary transmission coil 182*a* and the second auxiliary transmission coil 182*b* are disposed can be perpendicular to the direction in which the third auxiliary transmission coil 183*a* and the fourth auxiliary transmission coil 183*b* are disposed.

Since each of the second coil array 182 and the third coil array 183 includes a smaller number of transmission coils than the first coil array 181, it is possible to reduce manufacturing costs while covering a wide charging area using the first coil array 181. In addition, since the second coil array 182 and the third coil array 183 partially overlap each other at the center portions thereof, it is possible to simultaneously charge a plurality of devices requiring different amounts of power.

Each of the transmission coils included in the coil arrays 181, 182 and 183 can be wound so as to form a quadrangular shape. Each of the transmission coils can be formed in a single-layer structure.

Each of the transmission coils included in the coil arrays 181, 182 and 183 can have the same physical characteristics within an error range due to undergoing the same manufacturing process.

The outer diameter of each transmission coil can be formed so as to correspond to the typical outer diameter of the reception coil included in the mobile terminal. The outer diameter of each transmission coil can be equal to or larger than the typical outer diameter of the reception coil included in the mobile terminal.

Since the outer diameter of each transmission coil is formed so as to correspond to the typical outer diameter of the reception coil included in the mobile terminal, the coupling factor between the transmission coil and the reception coil can increase.

The shielding member 190 can be disposed at one side of each of the coil arrays 181, 182 and 183 to block the leaked magnetic field.

The shielding member 190 can be made of cobalt-based amorphous metal, which has high permeability and is not fragile, such as cobalt (Co), iron (Fe), nickel (Ni), boron (B), and silicon (Si). Alternatively, the shielding member 190 can be a ferrite plate formed by stacking ferrite cores in multiple layers.

The shielding member 190 can be formed to have an area larger than the area in which the first coil array 181 is disposed.

Since the shielding member 190 is formed to have an area larger than the area in which the first coil array 181 is disposed, it is possible to reduce the leakage of the magnetic field and to maximize the directivity of the magnetic field.

In addition, the shielding member 190 can prevent elements (e.g., a microprocessor) mounted on the circuit board from being electromagnetically affected by the operation of the transmission coils, or can prevent the transmission coils from being electromagnetically affected by the operation of elements mounted on the circuit board.

The shielding member 190 can have a recess 195 formed therein so as to extend in the upward-downward direction U-D. The shielding member 190 can extend in the longitudinal direction of the mobile terminal in consideration of the position on the charging surface at which the mobile terminal is placed. In this case, the extending direction can be the same as the direction in which the third auxiliary transmission coil 183*a* and the fourth auxiliary transmission coil 183*b* are arranged.

The recess 195 can be formed to have a width sufficient to seat the first auxiliary transmission coil 182*a* and the second auxiliary transmission coil 182*b* therein. The thickness of the recess 195 can be equal to the thickness of each of the first auxiliary transmission coil 182*a* and the second auxiliary transmission coil 182*b*.

The first auxiliary transmission coil 182*a* and the second auxiliary transmission coil 182*b* can be seated in the recess 195. The first auxiliary transmission coil 182*a* and the second auxiliary transmission coil 182*b* can be fixed to the shielding member 190 using an adhesive material.

Since the first auxiliary transmission coil 182*a* and the second auxiliary transmission coil 182*b* are seated in the recess 195, it is possible to prevent the coil arrays 181, 182 and 183 from being separated by external shocks.

In addition, since the first auxiliary transmission coil 182*a* and the second auxiliary transmission coil 182*b* are seated in the recess 195, some regions of the first main transmission coil 181*a*, the third main transmission coil 181*c*, the fourth main transmission coil 181*d*, the sixth main transmission coil 181*f*, the seventh main transmission coil 181*g*, and the ninth main transmission coil 181*i* can be in close contact with the shielding member 190.

Due to the above overlapping structure of the coil arrays 181, 182 and 183, separation of the transmission coils can be prevented, leakage of the magnetic field can be reduced, the directivity of the magnetic field can be improved, and the heat generated by the main transmission coils can be more easily dissipated.

Figure 5:
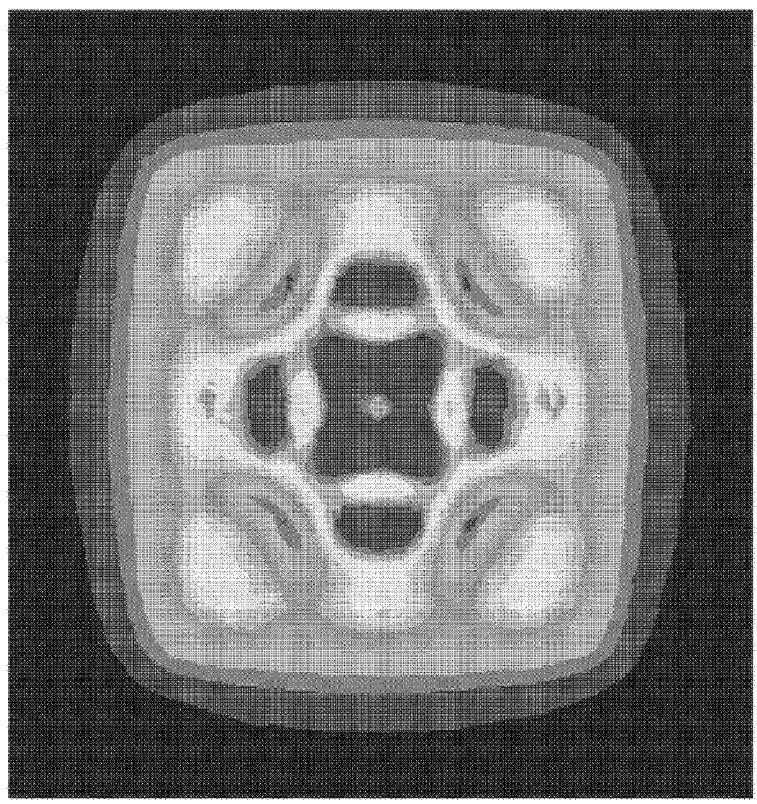
FIG. 5 is a view for explaining the intensity of a magnetic field of the coil shown in FIG. 1.
Figure 6:
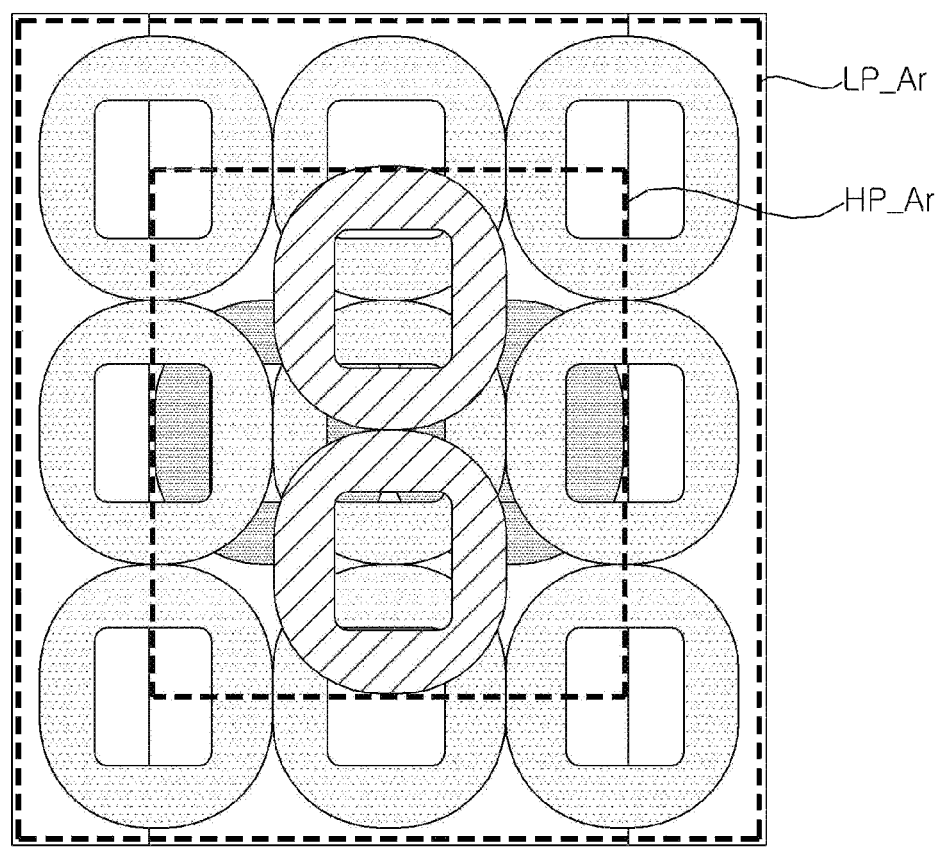
FIG. 6 is a view for explaining a charging area according to the magnetic field of the coil.

FIG. 5 is a view for explaining the intensity of the magnetic field of the coil shown in FIG. 1, and FIG. 6 is a view for explaining the charging area according to the magnetic field of the coil.

Referring to the drawings, since the coil arrays 181, 182 and 183 partially overlap each other, a field construction effect and a field deconstruction effect can occur due to the overlapping fields.

In particular, the dark portion in FIG. 5 can denote a hot zone generated due to field construction.

The hot zone can be generated by the overlapping regions of the first coil array 181, the second coil array 182, and the third coil array 183.

When a device is placed in the hot zone, it is possible to transmit higher power to the device. Hereinafter, the hot zone can be referred to as a first power transfer area HP_Ar.

An area other than the dark portion in FIG. 5 can be an area that exhibits lower charging performance than the hot zone, but transmits power sufficient to charge a device requiring relatively low power. This area can be referred to as a second power transfer area LP_Ar so as to distinguish the same from the first power transfer area HP_Ar.

The first power transfer area HP_Ar and the second power transfer area LP_Ar can be distributed on the shielding member 190, as shown in FIG. 6.

The wireless charging apparatus 100 according to the present disclosure can transmit the first power to the first device placed on the charging surface through the first power transfer area HP_Ar and can transmit the second power, which is lower than the first power, to the second device placed on the charging surface through the second power transfer area LP_Ar.

In addition, the wireless charging apparatus 100 according to the present disclosure is driven in a single-driving mode, thereby simultaneously charging the first device and the second device, which require different amounts of power, in different areas.

Figure 7:
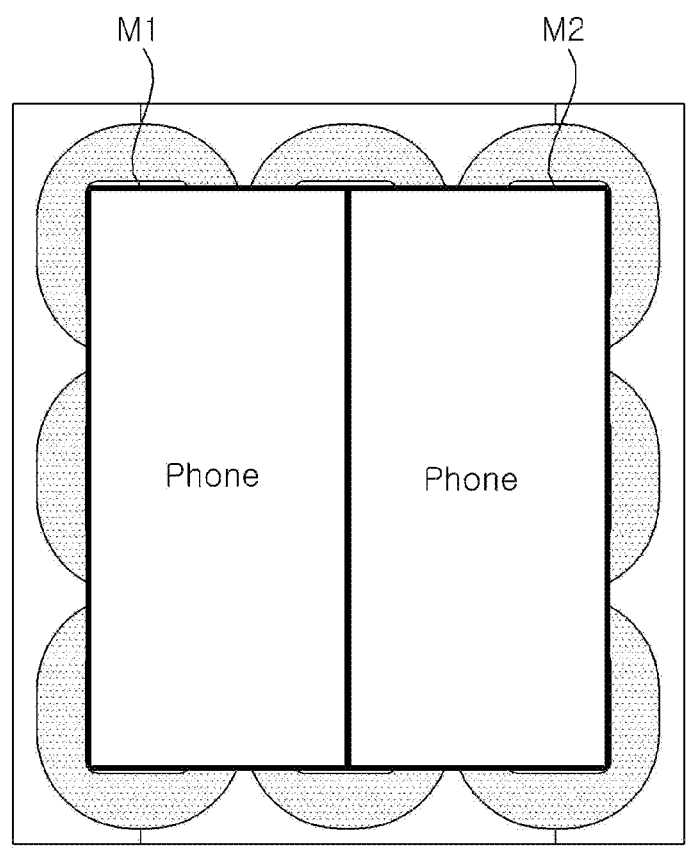
FIG. 7 is a view for explaining an example of charging a device in the charging area shown in FIG. 6.
Figure 8:
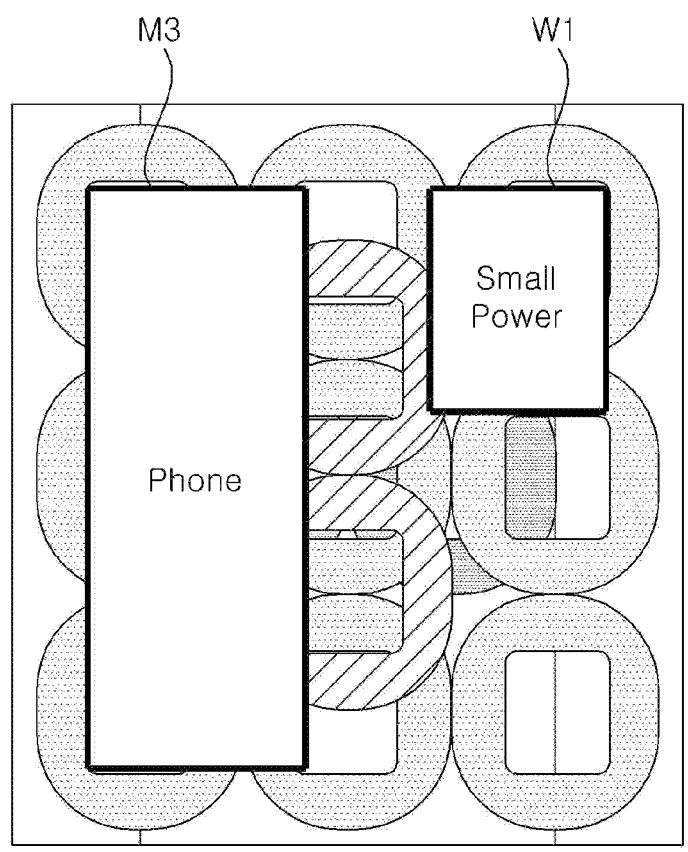
FIG. 8 is a view for explaining an example of charging a device in the charging area shown in FIG. 6.

FIGS. 7 and 8 are views for explaining examples of charging devices in the charging areas shown in FIG. 6.

Referring to FIG. 7, the wireless charging apparatus according to the present disclosure can transmit the first power to the first device through the first power transfer area HP_Ar. In this case, the first device can be a mobile terminal.

As described above, the outer diameter of each transmission coil can be set in consideration of the typical outer diameter of the reception coil included in the mobile terminal, and the main transmission coils included in the first coil array 181 can be disposed in the form of a matrix having three rows and three columns. Thus, at least two mobile terminals can be simultaneously disposed on the charging surface.

That is, as shown in FIG. 7, a first mobile terminal M1 and a second mobile terminal M2 can be simultaneously placed on the shielding member 190, and the wireless charging apparatus 100 can simultaneously charge the first mobile terminal M1 and the second mobile terminal M2.

As shown in FIG. 8, the wireless charging apparatus according to the present disclosure can transmit the first power to a first device through the first power transfer area HP_Ar and can transmit the second power to a second device through the second power transfer area LP_Ar.

In this case, the first device can be a mobile terminal, and the second device can be a smart watch.

That is, as shown in FIG. 8, a third mobile terminal M3 and a smart watch W1 can be simultaneously placed on the shielding member 190, and the wireless charging apparatus 100 can simultaneously charge the third mobile terminal M3 and the smart watch W1.

FIG. 9 is a view for explaining a change in the coupling factor of the coil according to the movement of the device.

Figure 9A:
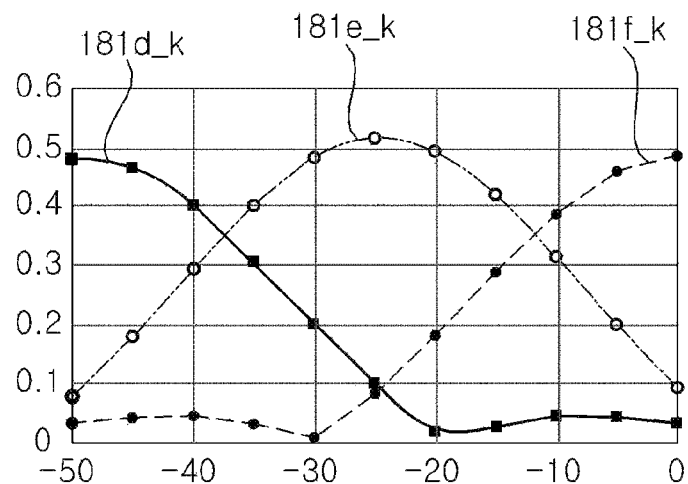
FIGS. 9A and 9B are views for explaining a change in the coupling factor of the coil according to the movement of the device.
Figure 9A:
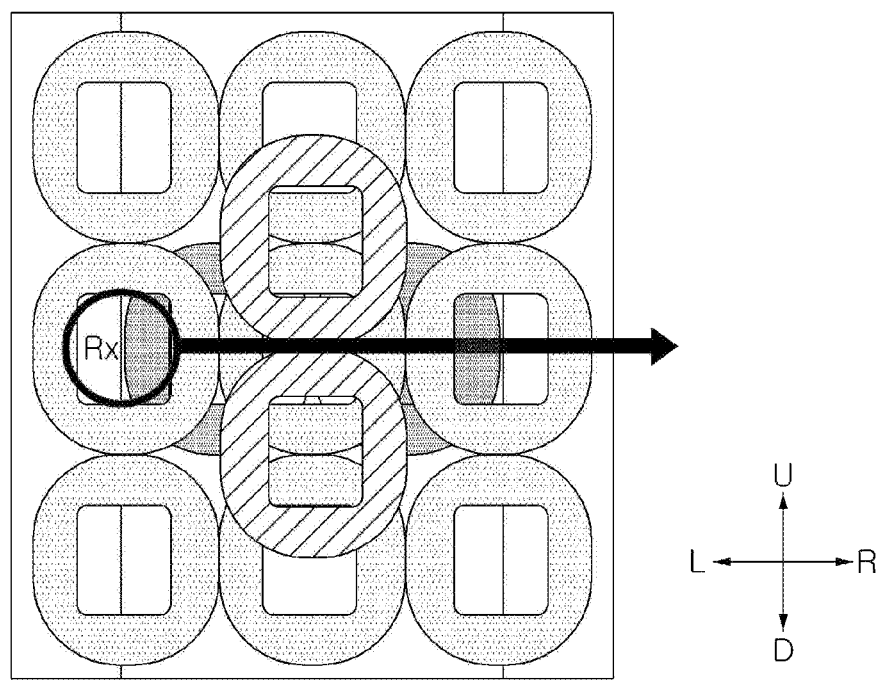
Figure 9B:
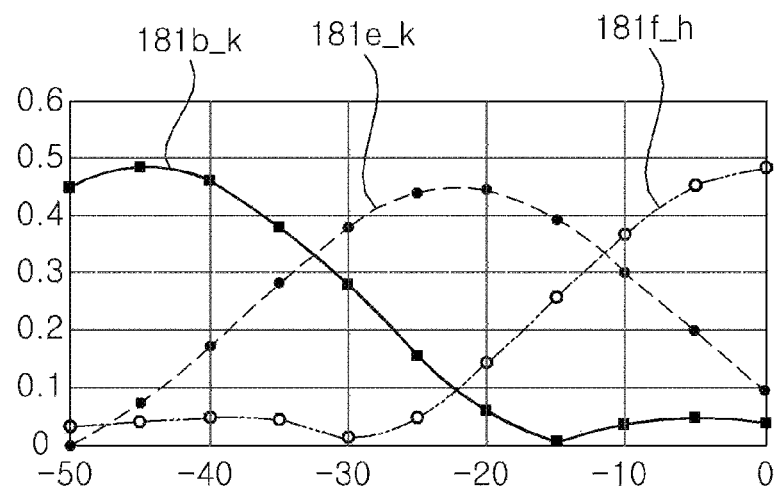
Figure 9B:
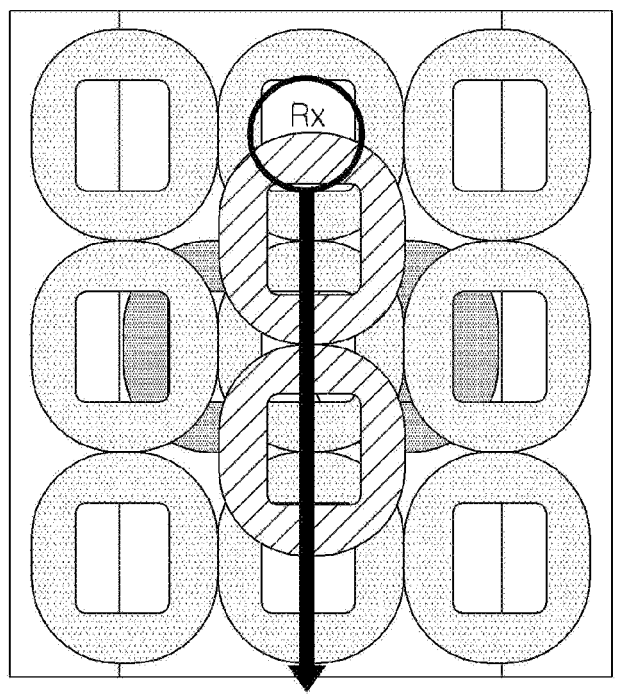

More specifically, FIG. 9A is a view showing a change in the coupling factor k when the reception coil Rx moves on the shielding member 190 in the leftward-rightward direction L-R, and FIG. 9B is a view showing a change in the coupling factor k when the reception coil Rx moves on the shielding member 190 in the upward-downward direction U-D.

As shown in FIG. 9A, when the reception coil Rx, which is located on the fourth main transmission coil 181$d$, moves onto the sixth main transmission coil 181$f$, the coupling factor 181$d$_$k$ of the fourth main transmission coil 181$d$ and the reception coil Rx can gradually decrease, the coupling factor 181$e$_$k$ of the fifth main transmission coil 181$e$ and the reception coil Rx can gradually increase and then gradually decrease, and the coupling factor 181$f$_$k$ of the sixth main transmission coil 181$f$ and the reception coil Rx can gradually increase.

However, the total coupling factor (181$d$_$k$+181$e$_$k$+181$f$_$k$) of the main transmission coils and the reception coil Rx can be uniform even when the reception coil Rx moves on the shielding member 190 in the leftward-rightward direction L-R.

As shown in FIG. 9B, when the reception coil Rx, which is located on the second main transmission coil 181$b$, moves onto the eighth main transmission coil 181$h$, the coupling factor 181$b$_$k$ of the second main transmission coil 181$b$ and the reception coil Rx can gradually decrease, the coupling factor 181$e$_$k$ of the fifth main transmission coil 181$e$ and the reception coil Rx can gradually increase and then gradually decrease, and the coupling factor 181$h$_$k$ of the eighth main transmission coil 181$h$ and the reception coil Rx can gradually increase.

However, the total coupling factor (181$b$_$k$+181$e$_$k$+181$h$_$k$) of the main transmission coils and the reception coil Rx can be uniform even when the reception coil Rx moves on the shielding member 190 in the upward-downward direction U-D.

Accordingly, the wireless charging apparatus 100 according to the present disclosure can ensure a uniform coupling factor regardless of the position at which a mobile terminal is placed on the charging surface or the orientation thereof.

Figure 10:
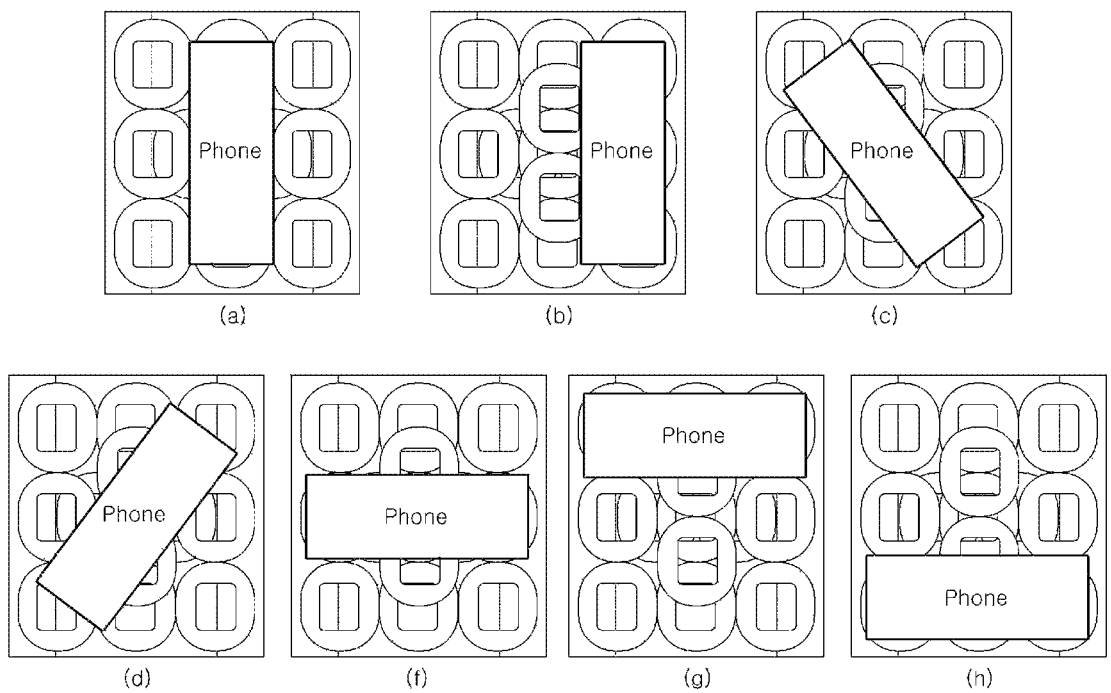
FIG. 10 is a view for explaining examples of charging the device in accordance with a change in the charging coupling factor.

FIG. 10 is a view for explaining examples of charging the device in accordance with a change in the charging coupling factor.

As described above with reference to FIG. 9, the wireless charging apparatus 100 according to the embodiment of the present disclosure has a uniform coupling factor over the charging surface. Thus, even when a mobile terminal is placed at any of various positions on the charging surface, as shown in FIG. 10, it is possible to ensure uniform charging efficiency.

Further, since the direction in which the second coil array 182 is disposed and the direction in which the third coil array 183 is disposed are perpendicular to each other, it is possible to charge a mobile terminal in the center region of the charging surface regardless of the position at which the mobile terminal is placed on the charging surface or the orientation thereof.

Figure 11:
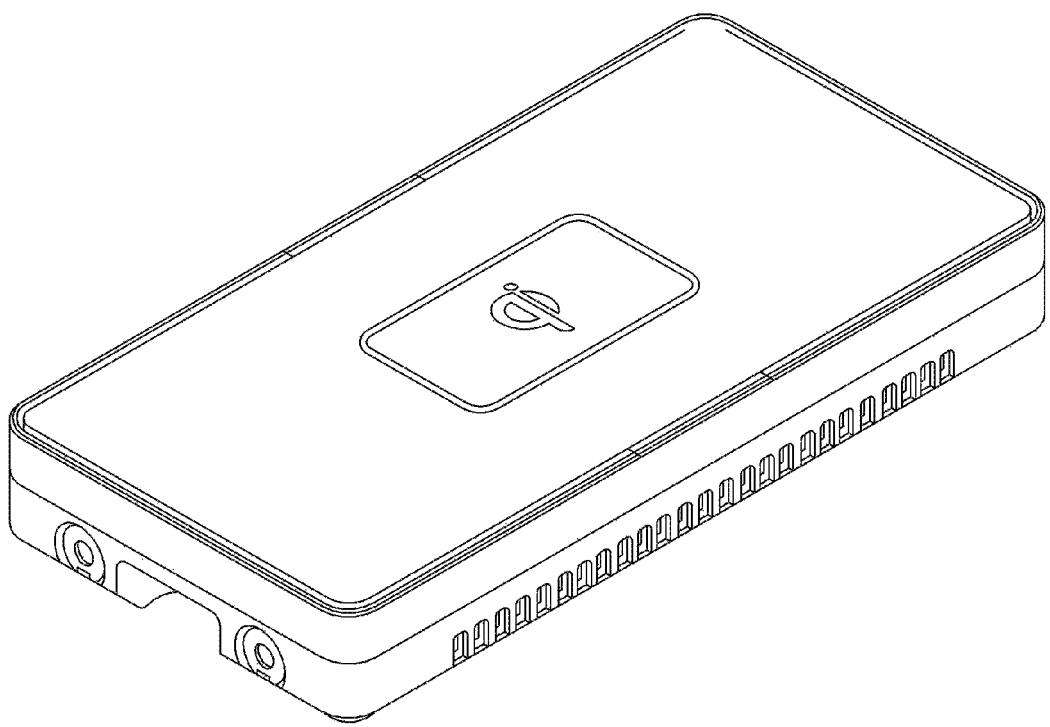
FIG. 11 is a perspective view of a wireless charging apparatus for a vehicle to which the wireless charging apparatus according to an embodiment of the present disclosure is applied.
Figure 12:
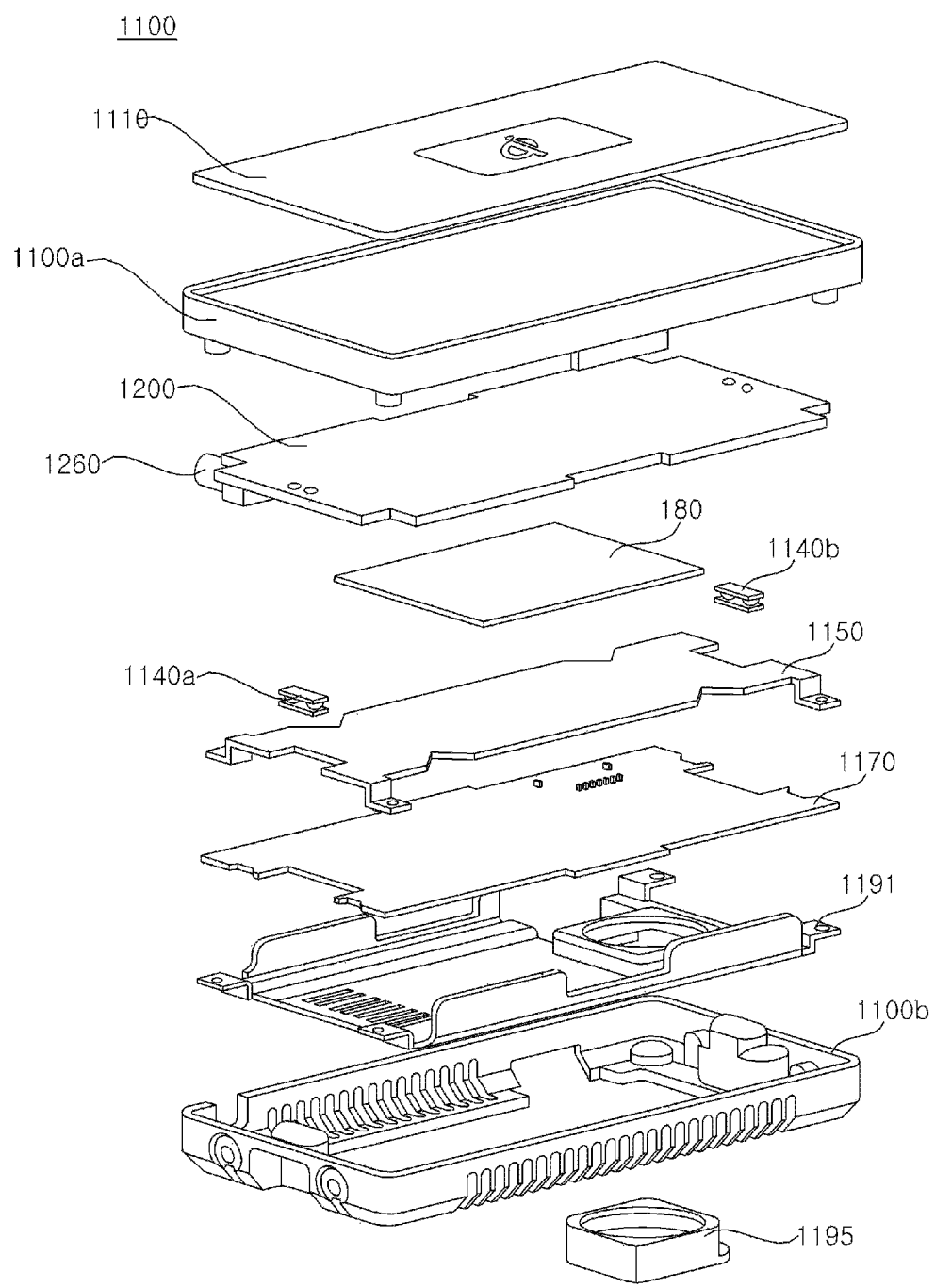
FIG. 12 is an exploded perspective view of the wireless charging apparatus for a vehicle shown in FIG. 11.

FIG. 11 is a perspective view of a wireless charging apparatus for a vehicle to which the wireless charging apparatus according to an embodiment of the present disclosure is applied, and FIG. 12 is an exploded perspective view of the wireless charging apparatus for a vehicle shown in FIG. 11.

Referring to the drawings, the wireless charging apparatus 1100 for a vehicle according to the present disclosure can include a housing 1100$a$ and 1100$b$, which accommodates electrical parts therein, a printed circuit board 1170, which is a controller mounted in the housing, a shield can 1150, which protects the printed circuit board, a coil 180, which wirelessly transmits power to a mobile terminal placed on the charging surface, and a reradiation antenna 1200, which receives an antenna signal and reradiates the antenna signal.

In addition, the wireless charging apparatus 1100 for a vehicle can further include a heat dissipation plate 1191, which dissipates heat generated by the printed circuit board 1170, the coil 180, the reradiation antenna 1200, and the like, and a fan module 1195, which reduces the amount of heat generated during the wireless charging process or the reradiation process by circulating internal air.

In addition, the wireless charging apparatus 1100 can further include a pad 1110 on which an external terminal 600 is placed.

The housing 1100$a$ and 1100$b$ can include an upper housing 1100$a$ and a lower housing 1100$b$. The coil 180 and the reradiation antenna 1200 can be mounted in the housing 1100$a$ and 1100$b$. A terminal for supplying power to the coil 180 and a terminal 1260 for supplying an antenna signal, which is received through an external antenna 30 located outside the vehicle, to the reradiation antenna 1200 can be exposed to the outside of the housing 1100$a$ and 1100$b$.

The controller 160 serves to receive external power through the printed circuit board 1170 and to supply the external power to the coil 180, and further serves to transmit a signal received from the external antenna 30 to the reradiation antenna 1200.

The shield can 1150 can be disposed on the top surface of the printed circuit board 1170 in order to dissipate heat and to provide a space in which elements are mounted on the printed circuit board 1170.

When current flows through the coil 180 located on the printed circuit board 1170, an electromagnetic field is formed, and current flows through the power reception coil of the device due to the electromagnetic field, thereby charging the device.

In this embodiment, the coil 180 is disposed on the shield can 1150.

The heat dissipation plate 1191 can dissipate internal heat. The heat dissipation plate 1191 can be formed of a metal material. For example, the heat dissipation plate 1191 can be formed of an aluminum material.

The fan module 1195 can be coupled to the heat dissipation plate 1191 in order to discharge internal heat to the outside or to introduce external heat into the interior of the housing. Accordingly, it is possible to reduce the generation of heat in the wireless charging apparatus 1100 for a vehicle.

The fan module 1195 can include at least one fan. For example, the fan can be any one of a rotating fan, a solid state fan, a piezoelectric fan, a blower fan, an axial-flow fan, and a mixed-flow fan.

In addition, in order to reduce the occurrence of vibration and noise due to the operation of the fan, vibration-absorbing members can be provided at contact regions of the fan included in the fan module 1195 and other parts.

The pad 1110 can be formed of a material having high frictional force (e.g., non-woven fabric, silicon, rubber, etc.) in order to prevent the external terminal 600 from being separated from the wireless charging apparatus 1100.

The pad 1110 can be formed of a non-metallic material in consideration of wireless transmission of power, radiation of a communication signal, and the like.

The wireless charging apparatus 100 according to the embodiment of the present disclosure can be applied to the wireless charging apparatus 1100 for a vehicle. That is, the coil 180 shown in FIGS. 11 and 12 can be the coil 180 described above with reference to FIGS. 1 to 10.

As is apparent from the above description, the present disclosure provides a wireless charging apparatus, in which first to third coil arrays are stacked on one another such that the intensity of a magnetic field (h-field) in the center region of a shielding member increases, thereby wirelessly transmitting first power through the center region of the shielding member and wirelessly transmitting second power, which is lower than the first power, through a region other than the center region of the shielding member. That is, the wireless charging apparatus according to the present disclosure is capable of charging a plurality of devices requiring different amounts of power.

In addition, since the wireless charging apparatus according to the present disclosure transmits power in a single-driving mode, rather than in a multi-driving mode, it is possible to simultaneously charge a plurality of devices.

In addition, since a plurality of main transmission coils included in the first coil array is disposed in the form of a matrix, it can ensure a uniform coupling factor over the charging surface, thereby reducing a dead zone in which charging is impossible.

In addition, since the number of auxiliary transmission coils included in each of the second coil array and the third coil array is smaller than the number of main transmission coils included in the first coil array, manufacturing costs can be reduced. Furthermore, since the auxiliary transmission coils are stacked on the center portion of the shielding member, it is possible to charge a plurality of devices without a separate region-dividing structure (e.g., a guide).

In addition, since the second coil array is seated in a recess formed in the shielding member, it can be prevented from being separated by external shocks.

In addition, since each transmission coil included in the wireless charging apparatus according to the present disclosure has a smaller outer diameter than a transmission coil used for a conventional wireless charging apparatus for a vehicle, it can generate a smaller amount of heat.

In addition, when the number of stacked layers of coil arrays is 4 or more, charging efficiency is greatly deteriorated. Therefore, the wireless charging apparatus according to the present disclosure has a three-layered structure, thereby minimizing loss of the charging efficiency.

The accompanying drawings are merely intended to facilitate understanding of the embodiments disclosed in this specification and not to restrict the technical spirit of the present disclosure. In addition, the accompanying drawings should be understood as covering all equivalents or substitutions within the scope of the present disclosure.

Similarly, operations are illustrated in a specific sequence in the drawings, but it is not understood that these operations need to be performed in the time sequence or sequentially or all of the illustrated operations need to be performed for an appropriate result. In a specific case, multitasking or parallel processing can be advantageous.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A wireless charging apparatus comprising:
   a plurality of coil arrays; and
   a shielding member disposed adjacent to the coil arrays to block a leaked magnetic field,
   wherein the coil arrays comprise:
   a first coil array comprising a plurality of transmission coils disposed adjacent to each other;
   a second coil array comprising a smaller number of transmission coils than the first coil array, the second coil array being disposed under the first coil array; and
   a third coil array disposed on the first coil array,
   wherein the second coil array comprises a first auxiliary transmission coil and a second auxiliary transmission coil disposed so as to be in contact with each other.

2. The wireless charging apparatus according to claim 1, wherein the first coil array comprises a first main transmission coil to a ninth main transmission coil disposed adjacent to each other.

3. The wireless charging apparatus according to claim 2, wherein the first to ninth main transmission coils are disposed in a form of a matrix having three rows and three columns.

4. The wireless charging apparatus according to claim 1, wherein the shielding member comprises a recess formed therein, the recess extending in an upward-downward direction, and
   wherein the first auxiliary transmission coil and the second auxiliary transmission coil are seated in the recess.

5. The wireless charging apparatus according to claim 1, wherein the first auxiliary transmission coil and the second auxiliary transmission coil are disposed so as to be symmetric to each other with respect to a vertical center line of the shielding member.

6. The wireless charging apparatus according to claim 5, wherein the third coil array comprises a third auxiliary transmission coil and a fourth auxiliary transmission coil disposed so as to be in contact with each other.

7. The wireless charging apparatus according to claim 6, wherein the third auxiliary transmission coil and the fourth auxiliary transmission coil are disposed so as to be symmetric to each other with respect to a horizontal center line of the shielding member.

8. The wireless charging apparatus according to claim 1, wherein each of the transmission coils included in each of the coil arrays is wound in a quadrangular shape.

9. The wireless charging apparatus according to claim 1, further comprising:
   a wireless power driver; and
   a controller configured to control the wireless power driver to simultaneously transmit wireless power through the coil arrays.

10. The wireless charging apparatus according to claim 1, further comprising:
a sensing unit configured to determine whether overheating of the wireless charging apparatus has occurred.

11. The wireless charging apparatus according to claim 10, wherein the sensing unit measures a temperature of the shielding member to provide a measurement result to the controller.

12. The wireless charging apparatus according to claim 1, wherein the first to third coil arrays are disposed to partially overlap in a central region of the first coil array.

13. The wireless charging apparatus according to claim 12, wherein the wireless charging apparatus comprises:
a first power transmission region configured to transmit power of a first power intensity in the center region; and
a second power transmission region configured to transmit power of a second power intensity in a region adjacent to the central region, the second power intensity being less than the first power intensity.

14. The wireless charging apparatus according to claim 13, wherein the wireless charging apparatus is configured to charge a first device in the first power transmission region, and to charge a second device in the second power transmission region.

15. The wireless charging apparatus according to claim 14, wherein the wireless charge apparatus has a mode in which the first and second devices are simultaneously charged in the first and second power transmission regions respectively.

16. The wireless charging apparatus according to claim 1, wherein the third coil array comprises a same number of transmission coils as the second coil array.

17. The wireless charging apparatus according to claim 1, wherein the first, second and third coil arrays are disposed on the shielding member.

18. The wireless charging apparatus according to claim 1, wherein the second or third coil array is aligned with a middle row or column of transmission coils in the first coil array.

19. The wireless charging apparatus according to claim 1, wherein the third coil array is aligned with a middle column of transmission coils in the first coil array, and
wherein the second coil array is aligned with a middle row of transmission coils in the first coil array.

* * * * *